United States Patent
Schwarz et al.

(10) Patent No.: US 7,360,831 B2
(45) Date of Patent: Apr. 22, 2008

(54) MOTORCYCLE SEAT

(76) Inventors: Herbert Schwarz, Birkenweg 3, Niedereschach (DE) D-78078; Jochen Schanz, Auf dem Zimmermann 7-9, Niedereschach (DE) D-78078; Karl Heinz Dorn, Klingenbachstrasse 55, Bisingen (DE) D-72406; Monika Dorn, Klingenbachstrasse 55, Bisingen (DE) D-72406

( * ) Notice: Subject to any disclaimer, the term of this patent is extended or adjusted under 35 U.S.C. 154(b) by 0 days.

(21) Appl. No.: 11/562,795

(22) Filed: Nov. 22, 2006

(65) Prior Publication Data

US 2007/0120411 A1 May 31, 2007

(30) Foreign Application Priority Data

Nov. 22, 2005 (DE) .................... 10 2005 055 921

(51) Int. Cl.
*B60N 2/38* (2006.01)

(52) U.S. Cl. .................... 297/195.1; 297/195.12; 297/214; 297/243; 297/452.27; 297/452.43

(58) Field of Classification Search ............ 297/195.1, 297/195.12, 214, 243, 452.27, 452.43
See application file for complete search history.

(56) References Cited

U.S. PATENT DOCUMENTS

| 3,712,673 | A | * | 1/1973 | Swenson | ............... 297/452.61 |
| 3,730,588 | A | * | 5/1973 | Braun | ..................... 297/284.1 |
| 4,190,697 | A | * | 2/1980 | Ahrens | ..................... 428/309.9 |
| 5,203,607 | A | * | 4/1993 | Landi | ......................... 297/214 |
| 5,252,373 | A | * | 10/1993 | Ganske et al. | ................ 428/68 |
| 5,720,518 | A | * | 2/1998 | Harrison | ..................... 297/214 |
| 5,836,654 | A | * | 11/1998 | DeBellis et al. | ....... 297/452.41 |

FOREIGN PATENT DOCUMENTS

| DE | 203 13 788 U1 | 2/2005 |
| WO | 0713900 B1 | 5/2003 |

* cited by examiner

*Primary Examiner*—Laurie K. Cranmer
(74) *Attorney, Agent, or Firm*—Akerman Senterfitt; Stephen A. Pendorf; Peter A. Chiabotti

(57) ABSTRACT

A motorcycle seat in the form of a tandem seat is assembled from a seat cushion (12), which is produced as a plastic foam molded part, a pad layer (14) of a open pore polyether foam material provided upon the seat surface of the seat cushion (12), a ventilation layer (16) of a spacer fabric provided upon the pad layer (14) and a seat cover (18), which is a breathable and water tight membrane.

20 Claims, 2 Drawing Sheets

MOTORCYCLE SEAT

FIELD OF THE INVENTION

The invention concerns a motorcycle seat, and more particularly, a tandem style seat.

BACKGROUND OF THE INVENTION

Motorcycle seats, in particular those designed as seats for sports bikes, are comprised of a seat platform, which is provided with cushioning or padding and is covered with a seat cover. In most cases, the seat cover is a plastic material, which can become uncomfortable particularly during prolonged travel in certain climactic conditions, for example traveling to motorcycle rallies or on motorcycle tours, due to the accumulation of sweat in the areas in contact with the plastic. Coverings made of leather exhibit certain advantages. It is also known to cover the seat with a pelt such as lambs wool. These measures that lead to an improvement, however, cannot sufficiently overcome the problem of uncomfortable development of heat and sweat.

SUMMARY

The invention is thus based upon the idea of providing a motorcycle seat, in particular a tandem style motorcycle seat, in which the seat comfort is improved in particular in the case of prolonged travel and high temperatures.

The inventive motorcycle seat, preferably in the form of a tandem seat, includes a seat body or platform, onto which seat platform a cushion of an open pore polyether foam material is provided. The seat cover is made of a breathable water-tight membrane. The combination of breathable membrane cover and the open-pore porous polyether foam cushion located under the seat cover enable air circulation through the seat surface, which is supplemented in particular by the fact that, due to the variation of loads on the seat surface by the rider when traversing uneven surfaces, a pumping action is exercised upon the open pore foam above the cushion layer. This air circulation counteracts the accumulation of heat in the seat and the accumulation of sweat caused thereby. Since the seat cover is water tight, it protects the foam cushion layer and the seat platform from penetration of moisture and soil.

In a preferred embodiment there is provided upon the cushion layer additionally a ventilation layer of a spacer fabric. This creation of space provides an elastic yielding hollow chamber or space, which on the one hand optimally conforms to the body of the rider and on the other hand enables a nearly unimpeded air circulation.

The seat cover is preferably produced using two different materials. The seat surface area of the seat cover exhibits a greater strength and a higher stress resistance, since this area of the seat cover is subjected to a stronger wear due to the rider. The side surfaces of the seat cover are, in contrast, comprised of a material of higher elasticity. The side surfaces are less subject to rubbing and frictional wear, but are however subject to greater deformations when the height of the seat changes due to the changing compression due to the weight of the rider. The different materials of the seat surface and the side surface are sewn together, wherein the seams are sealed so as to be water tight, so that penetration of moisture is prevented at these seams.

BRIEF DESCRIPTION OF THE DRAWINGS

In the following the invention will be described in greater detail on the basis of the illustrative embodiment shown in the drawings. There is shown in.

DETAILED DESCRIPTION OF THE PREFERRED EMBODIMENTS

Figure 1:
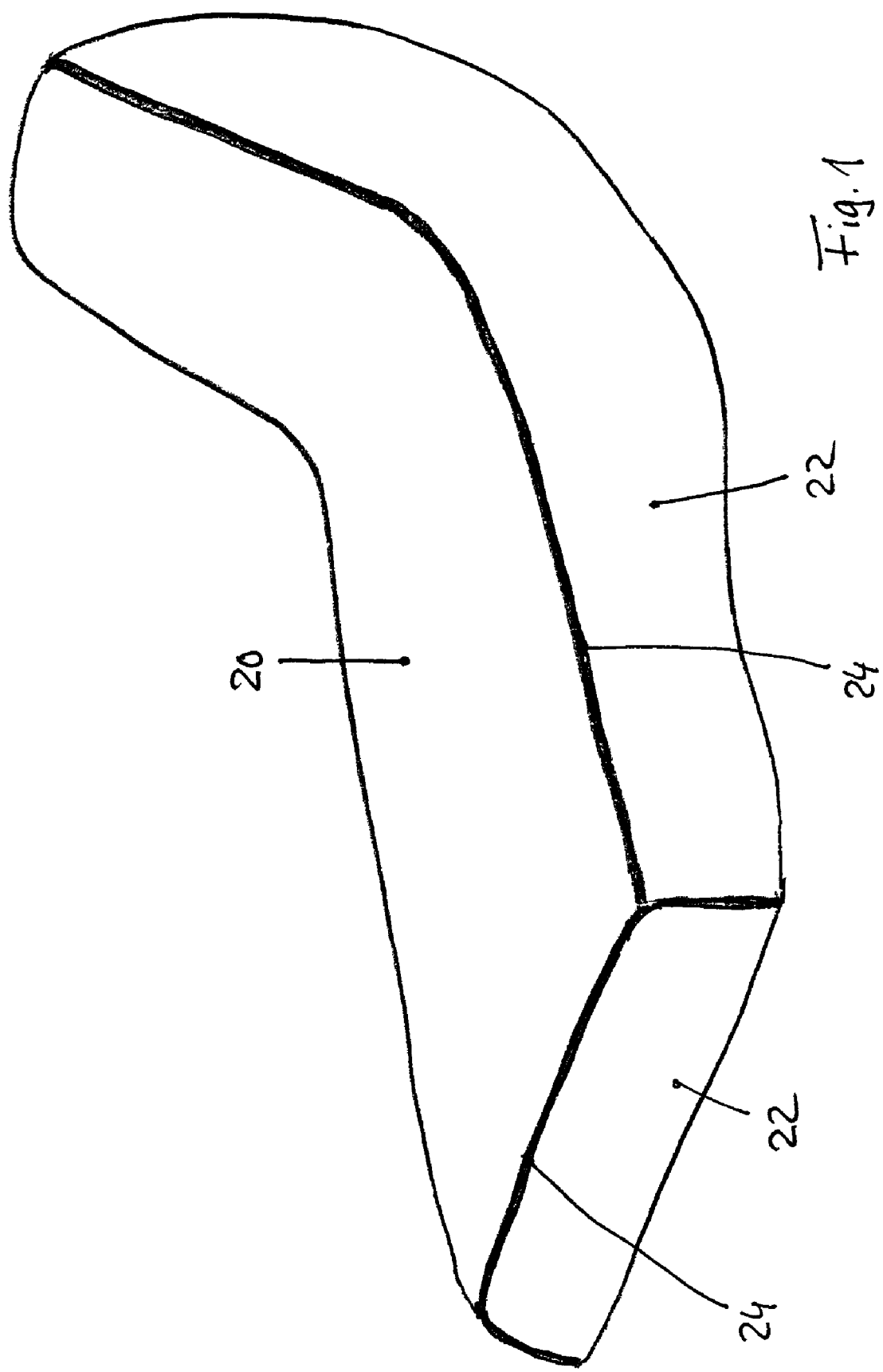
FIG. 1 a perspective view of a tandem seat, and
FIG. 2 a vertical longitudinal section through the tandem seat of FIG. 1.
Figure 2:
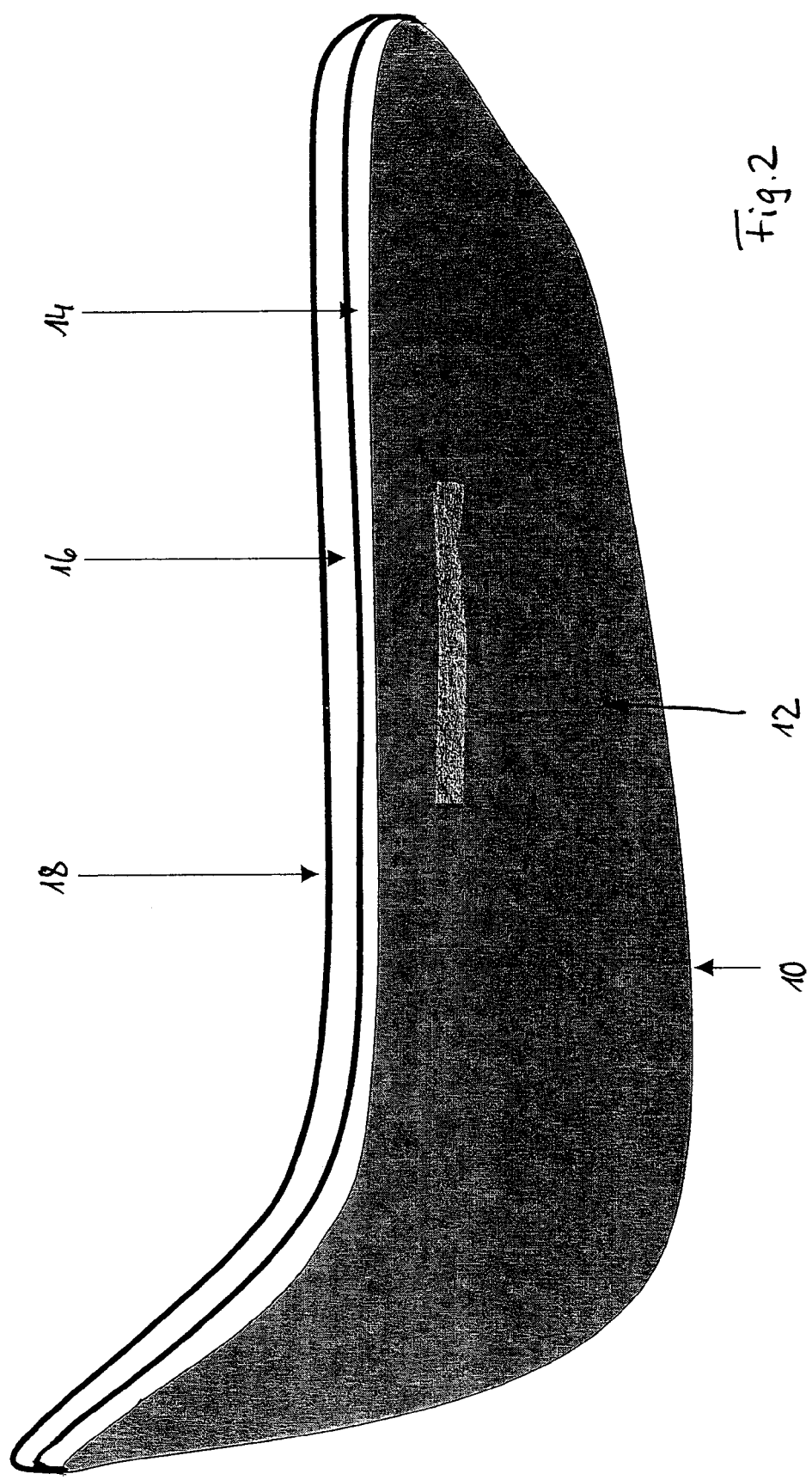

The motorcycle seat, which is in the form of a tandem seat in the illustrated embodiment, includes a platform 10 indicated schematically in the figure, which serves for securing of the tandem seat to the motorcycle. The platform 10 is made of metal or plastic, preferably of a fiberglass reinforced plastic.

On the platform 10 a seat cushion 12 is provided, which essentially determines the shape and the height of the tandem seat. The seat cushion 12 is a shaped part, which is preferably comprised of a polyurethane foam material. The seat cushion 12 can be produced as a cold foam. For high load bearing capacity, for rigidity and long life and durable elasticity, the seat cushion 12 is preferably made of a composite foam. One such composite foam material can have a green density of approximately 100-140 kg/m$^3$ and a compression load deflection of approximately 10-30 kPa.

On the top side of the seat cushion 12, which forms the seat surface of the tandem seat, a pad layer 14 is provided. The pad layer 14 is comprised of a highly elastic open pore polyether foam material. This polyether foam material preferably has a green density of approximately 30-45 kg/m$^3$ and a compression load deflection of approximately 5-9 kPa. The thickness of the pad layer 14 is preferably approximately 4 to 12 cm. Due to its thickness and elasticity, the pad layer 14 can be optimally conformed to the body of the rider sitting on the tandem seat, however, it does not detract from the stable supporting of the rider by the seat cushion 12. The pad layer 14 covers the upper side of the seat cushion 12 over the entire surface.

A breathing or ventilation layer 16 of a spacer fabric is provided upon the pad layer 14. This ventilation layer 16 also covers the pad layer 14 and therewith the upper side of the seat cushion 12 over the entire surface. The ventilation layer 16 having a spacer fabric is comprised of two textile outer surfaces, which are joined by spacer threads and are simultaneously kept spaced apart. The textile outer surfaces are air transmissive. The spacer threads keep the textile outer surfaces elastically sprung spaced apart, so that on the one hand a large volume of intermediate space is kept free between the two textile outer surfaces and, on the other hand, the entire ventilation layer 16 is elastically deformable. The ventilation layer 16 with a spacer fabric preferably has a thickness of approximately 8 to 12 mm.

The entire assembly of the tandem seat is covered at least on the upper seat surface and the side seat surfaces by a cover 18. The cover 18 is comprised of a breathable water tight membrane. This membrane is comprised of, for example, a hydrophobic expanded polytetrafluorethylene with an integrated oil repellent or resistant substance. This membrane renders the cover 18 permeable for air and water vapor, however, prevents the penetration of moisture and wetness and soil such as oil or the like.

The cover 18 is preferably produced from two different materials, which are however both breathable and water tight membranes. For the upper seat surface covering area 20 of the seat cover 18 a material is employed, which has a higher strength and a higher stress resistance. The side surface areas 22 of the tandem seat cover 18 are in contrast produced from a material which exhibits in particular a higher elasticity. The upper seat surface covering area 20 and the side surface areas 22 are sewn together to form the total seat cover 18 wherein the seams 24 are made water tight, for example are sealed, adhered or welded.

The seat cover 18, the ventilation layer 16 and the pad layer 14 form a covering for the seat surface of the tandem seat, which provides an elastic cushioning and a high air transmissivity and a relatively large air take-up volume. The cover 18 thereby covers the tandem seat water-tight and soil resistant.

REFERENCE NUMBER LIST

10 Seat platform
12 Seat cushion
14 Pad layer
16 Ventilation layer
18 Seat cover
20 Upper seat surface covering area of 18
22 Side surfaces areas of 18
24 Seam

The invention claimed is:

1. A motorcycle seat, comprising:
a seat cushion (12), which is produced as a plastic foam molded part, in particular of polyurethane, with a pad layer (14) of an open pore polyether foam material provided on an upper seating surface of the seat cushion (12), and with a seat cover (18) covering at least a seat surface and side surfaces, which seat cover (18) is a breathable water tight membrane;
wherein the breathable water tight membrane of the seat cover (18) is comprised of a hydrophobic expanded polytetrafluorethylene with an integrated oil repellent or resistant material.

2. The motorcycle seat according to claim 1, wherein the polyether foam material of the pad layer (14) is highly elastic.

3. The motorcycle seat according to claim 2, wherein the polyether foam material exhibits a green density of approximately 30 to 45 kg/m$^3$ and a compression load deflection of approximately 5 to 9 kPa.

4. The motorcycle seat according to claim 1, wherein the pad layer (14) has a thickness of approximately 4 to 12 cm.

5. The motorcycle seat according to claim 1, wherein a ventilation layer (16) of a spacer fabric is provided upon the pad layer (14).

6. The motorcycle seat according to claim 5, wherein the spacer fabric has a thickness of approximately 8 to 12 mm.

7. The motorcycle seat according to claim 1, wherein an area of the seat cover (18) forming the seat surface (20) exhibits a greater strength and a higher compression load deflection and areas of the seat cover (18) forming the side surfaces (22) exhibit a higher elasticity.

8. The motorcycle seat according to claim 7, in which the areas of the seat covering (18) forming the seat surface (20) and the side surfaces (22) are joined to each other by water tight seams (24).

9. The motorcycle seat according to one of claim 1, wherein the seat cushion (12), the pad layer (14) and the seat cover (18) form a tandem seat.

10. A motorcycle seat, comprising:
a seat cushion (12), which is produced as a plastic foam molded part, in particular of polyurethane, with a pad layer (14) of an open pore polyether foam material provided on an upper seating surface of the seat cushion (12), and with a seat cover (18) covering at least a seat surface and side surfaces, which seat cover (18) is a breathable water tight membrane;
wherein an area of the seat cover (18) forming the seat surface (20) exhibits a greater strength and a higher compression load deflection and areas of the seat cover (18) forming the side surfaces (22) exhibit a higher elasticity.

11. The motorcycle seat according to claim 10, wherein the polyether foam material of the pad layer (14) is highly elastic.

12. The motorcycle seat according to claim 11, wherein the polyether foam material exhibits a green density of approximately 30 to 45 kg/m$^3$ and a compression load deflection of approximately 5 to 9 kPa.

13. The motorcycle seat according to claim 10, wherein the pad layer (14) has a thickness of approximately 4 to 12 cm.

14. The motorcycle seat according to claim 10, wherein a ventilation layer (16) of a spacer fabric is provided upon the pad layer (14).

15. The motorcycle seat according to claim 14, wherein the spacer fabric has a thickness of approximately 8 to 12 mm.

16. The motorcycle seat according to claim 10, wherein the breathable water tight membrane of the seat cover (18) is comprised of a hydrophobic expanded polytetrafluorethylene with an integrated oil repellent or resistant material.

17. The motorcycle seat according to claim 10, in which the areas of the seat covering (18) forming the seat surface (20) and the side surfaces (22) are joined to each other by water tight seams (24).

18. The motorcycle seat according to one of claim 10, wherein the seat cushion (12), the pad layer (14) and the seat cover (18) form a tandem seat.

19. The motorcycle seat according to claim 10, in which the areas of the seat covering (18) forming the seat surface (20) and the side surfaces (22) are joined to each other by water tight seams (24);
wherein the pad layer (14) has a thickness of approximately 4 to 12 cm; and
wherein the spacer fabric has a thickness of approximately 8 to 12 mm.

20. A motorcycle seat, comprising:
a seat cushion (12), which is produced as a plastic foam molded part, in particular of polyurethane, with a pad layer (14) of an open pore polyether foam material provided on an upper seating surface of the seat cushion (12), and with a seat cover (18) covering at least a seat surface and side surfaces, which seat cover (18) is a breathable water tight membrane;
wherein the breathable water tight membrane of the seat cover (18) is comprised of a hydrophobic expanded polytetrafluorethylene with an integrated oil repellent or resistant material;
wherein an area of the seat cover (18) forming the seat surface (20) exhibits a greater strength and a higher compression load deflection and areas of the seat cover (18) forming the side surfaces (22) exhibit a higher elasticity;
wherein the polyether foam material exhibits a green density of approximately 30 to 45 kg/m$^3$ and a compression load deflection of approximately 5 to 9 kPa; and
wherein a ventilation layer (16) of a spacer fabric is provided upon the pad layer (14).

* * * * *